US007522160B2

(12) United States Patent
Moon

(10) Patent No.: US 7,522,160 B2
(45) Date of Patent: Apr. 21, 2009

(54) SIGNAL CONVERTING CIRCUIT FOR DRIVING A SHIFT REGISTER AND DISPLAY APPARATUS HAVING THE SAME

(75) Inventor: Seung-Hwan Moon, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 809 days.

(21) Appl. No.: 10/914,120

(22) Filed: Aug. 10, 2004

(65) Prior Publication Data

US 2005/0035958 A1 Feb. 17, 2005

(30) Foreign Application Priority Data

Aug. 14, 2003 (KR) ..................... 10-2003-0056383

(51) Int. Cl.
*G06F 3/038* (2006.01)

(52) U.S. Cl. .......................... 345/204; 345/99; 345/100

(58) Field of Classification Search ........... 345/98–100, 345/211–213, 204, 3.1–3.4
See application file for complete search history.

(56) References Cited

U.S. PATENT DOCUMENTS

| | | | | |
|---|---|---|---|---|
| 4,194,215 | A * | 3/1980 | Shionoya | 348/803 |
| 5,850,216 | A * | 12/1998 | Kwon | 345/204 |
| 6,373,458 | B1 * | 4/2002 | Yamakura et al. | 345/98 |
| 6,784,880 | B2 * | 8/2004 | Fujita et al. | 345/213 |
| 6,903,717 | B2 * | 6/2005 | Takahashi et al. | 345/100 |
| 7,133,013 | B2 * | 11/2006 | Kamezaki et al. | 345/98 |
| 2001/0052887 | A1 * | 12/2001 | Tsutsui et al. | 345/87 |
| 2002/0093498 | A1 * | 7/2002 | Park | 345/204 |

* cited by examiner

*Primary Examiner*—Chanh Nguyen
*Assistant Examiner*—Bao-Quan T Ho
(74) *Attorney, Agent, or Firm*—Haynes & Boone LLP

(57) ABSTRACT

In a signal converting circuit to drive a shift register and a display apparatus having the signal converting circuit, a conversion control part outputs a first line selection signal, a second line selection signal and odd and even numbered line control signals based on a primary scan start signal to select a first scan line, a gate selection signal and an output enable signal. A signal output part outputs first and second clock signals and a converted scan start signal based on the first and second line selection signals, the odd and even numbered line control signals and the primary scan start signal. The first and second clock signals and the converted scan start signal have higher magnitudes than the signals outputted from the conversion control part. Therefore, a shift register formed on the display panel may be driven using the signals outputted from a timing controlling circuit.

16 Claims, 6 Drawing Sheets

300

SIGNAL CONVERTING CIRCUIT FOR DRIVING A SHIFT REGISTER AND DISPLAY APPARATUS HAVING THE SAME

CROSS-REFERENCE OF RELATED APPLICATIONS

The present application claims priority from Korean Patent Application No. 2003-56383, filed on Aug. 14, 2003, the disclosure of which is hereby incorporated herein by reference in its entirety.

BACKGROUND OF THE INVENTION (a) Field of the Invention

The present invention relates to a signal converting circuit and a display apparatus having the signal converting circuit. More particularly, the present invention relates to a signal converting circuit to drive a shift register and a display apparatus having the signal converting circuit.

(b) Description of the Related Art

In order to decrease a manufacturing cost of a display apparatus and to manufacture the display apparatus having a narrow bezel, a gate driving circuit or a data driving circuit is integrated on a display panel, for example, such as a liquid crystal display (LCD) panel, a plasma display panel (PDP), an organic light emitting display (OLED) panel, etc. A scan driving circuit having amorphous silicon thin film transistors (a-Si TFTs) may have a simplified structure so that the gate driving circuit or the data driving circuit is integrated on the LCD panel. The scan driving circuit having the a-Si TFTs may have a lower manufacturing cost than the scan driving circuit having poly-silicon TFTs.

A conventional scan driving circuit includes a shift register. The scan driving circuit outputs a gate pulse to activate a scan line of an LCD panel. A unit stage of the shift register includes an S-R latch and an AND gate.

The S-R latch is activated by a first input signal that is an output signal of a previous stage, and the S-R latch is deactivated by a second input signal that is an output signal of a next stage. When the S-R latch is activated and a first clock signal is in a high state, the AND gate generates the gate pulse. The gate pulse may be a scan signal.

The first clock signal and a second clock signal having an opposite phase to the first clock signal are applied to the unit stage of the shift register to activate scan lines.

The unit stage of the shift register includes a buffering circuit, a charging circuit, a driving circuit and a discharging circuit. The shift register outputs the gate signal based on a scan start signal or the output signal of the previous stage.

The buffering circuit has a first transistor including a first drain electrode, a first gate electrode and a first source electrode. The first drain electrode is electrically connected to the first gate electrode to receive the first input signal. The first source electrode is electrically connected to a first capacitor electrode of the charging circuit that includes a capacitor. The first capacitor electrode of the capacitor is electrically connected to the first source electrode of the first transistor and the discharging circuit. A second capacitor electrode of the capacitor is electrically connected to the driving circuit.

The driving circuit has a second transistor and a third transistor. The second transistor includes a second drain electrode, a second gate electrode and a second source electrode. The second drain electrode is electrically connected to a clock terminal. The second gate electrode is electrically connected to the first capacitor electrode of the capacitor of the charging circuit through a first node. The second source electrode is electrically connected to the second capacitor electrode of the capacitor and the output terminal. The third transistor includes a third drain electrode, a third source electrode and a third gate electrode. The third drain electrode is electrically connected to the second source electrode of the second transistor and the second capacitor electrode of the capacitor. The first voltage is applied to the third source electrode. The first clock signal or the second clock signal that has the opposite phase to the first clock signal is applied to the clock terminal.

The discharging circuit has a fourth transistor that includes a fourth drain electrode, a fourth gate electrode and a fourth source electrode. The fourth drain electrode is electrically connected to the first capacitor electrode of the capacitor. The fourth gate electrode is electrically connected to the third gate electrode of the third transistor to receive the second input signal. The first voltage is applied to the fourth source electrode.

When the first input signal is in the high state, an electric charge is stored in the capacitor. When the second input signal is in the high state, the electric charge that is stored in the capacitor is discharged to perform an S-R latch operation.

When the electric charge is stored in the capacitor, the first clock signal or the second clock signal that is applied to the clock terminal is applied to the output terminal through the second transistor that is turned on by the stored electric charge. When the first clock signal is or the second clock signal is applied to the output terminal that is electrically connected to a scan line of the LCD panel, amorphous-silicon (a-Si) TFTs that are electrically connected to the scan line are turned on. Each of the a-Si TFTs functions as a switching transistor. The second transistor is turned on by the second input signal so that the output terminal is pulled down at the first voltage, thereby performing an AND gate operation.

A driving voltage for turning on each of the a-Si TFTs that are electrically connected to the scan line in a display region may be higher than a driving voltage for turning on each of the poly silicon TFTs. In addition, the first voltage for turning off each of the a-Si TFTs is lower than a turn-off voltage for turning off each of the poly silicon TFTs. That is, a voltage range for driving the shift register having the a-Si TFTs is wider than a voltage range for driving the shift register having the poly silicon TFTs.

BRIEF SUMMARY OF THE INVENTION

The present invention provides a signal converting circuit to drive a shift register using signals outputted from a timing controlling circuit.

The present invention also provides a display apparatus having the above-mentioned signal converting circuit.

A signal converting circuit in accordance with an aspect of the present invention includes a conversion control part and a signal output part. The conversion control part is configured to output a first line selection signal, a second line selection signal, an odd numbered line control signal and an even numbered line control signal based on a primary scan start signal that selects a first scan line, a gate selection signal that selects a next scan line and an output enable signal that controls an output of a scan line driving part. The signal output part is configured to output a first clock signal, a second clock signal and a converted scan start signal based on the first and second line selection signals, the odd and even numbered line control signals and the primary scan start signal. The first and second clock signals have higher magnitudes than the line selection signals and the line control signals. The converted scan start signal has higher magnitude than the primary scan start signal to select the first scan line.

The signal converting circuit is disposed between a timing controlling circuit and a shift register of a display panel. The primary scan start signal, the gate selection signal and the output enable signal are transmitted from the timing controlling circuit to the signal converting circuit. The first and second clock signals and the converted scan start signal are transmitted from the signal converting circuit to the shift register.

A signal converting circuit in accordance with another aspect of the present invention includes a conversion control part and a signal output part. The conversion control part is configured to output a second line selection signal, an odd numbered line control signal and an even numbered line control signal based on a primary scan start signal that selects a first scan line, a gate selection signal that selects a next scan line and an output enable signal that controls an output of a scan line driving part. The signal output part is configured to output a first clock signal, a second clock signal and a converted scan start signal based on the second line selection signal, the odd and even numbered line control signals and the primary scan start signal. The first and second clock signals have higher magnitudes than the second line selection signal and the line control signals. The converted scan start signal has higher magnitude than the primary scan start signal to select the first scan line.

The signal converting circuit is disposed between a timing controlling circuit and a shift register of a display panel. The primary scan start signal, the gate selection signal and the output enable signal are transmitted from the timing controlling circuit to the signal converting circuit. The first and second clock signals and the converted scan start signal are transmitted from the signal converting circuit to the shift register.

A display apparatus in accordance with an exemplary embodiment of the present invention includes a timing controlling circuit, a data driving circuit, a signal converting circuit, a scan driving circuit and a display panel. The timing controlling circuit is configured to output a primary image signal, a primary scan start signal, a gate selection signal and an output enable signal. The data driving circuit is configured to output an image signal based on the primary image signal. The signal converting circuit is configured to increase magnitudes of the primary scan start signal, the gate selection signal and the output enable signal to output a first clock signal, a second clock signal and a converted scan start signal. The first and second clock signals have higher magnitudes than the gate selection signal and the output enable signal. The converted scan start signal has higher magnitude than the primary scan start signal. The scan driving circuit is configured to output scan signals, in sequence, based on the first and second clock signals and the converted scan start signal. The display panel includes scan lines that transfer the scan signals, a data line that transfers the image signal, a switching element disposed in a region defined by the scan lines and the data lines, and a pixel electrode that is electrically connected to the switching element.

When levels of the gate selection signal, the output enable signal and the primary scan start signal are positive levels, the levels of the gate selection signal, the output enable signal and the primary scan start signal are increased to generate the first and second clock signals and the converted scan start signal having higher levels than the gate selection signal, the output enable signal and the primary scan start signal. In contrast, when the levels of the gate selection signal, the output enable signal and the primary scan start signal are negative levels, the levels of the gate selection signal, the output enable signal and the primary scan start signal are decreased to generate the first and second clock signals and the converted scan start signal having lower levels than the gate selection signal, the output enable signal and the primary scan start signal. That is, the levels of the gate selection signal, the output enable signal and the primary scan start signal are shifted.

Therefore, the magnitude of the control signals or the clock signals that are outputted from the timing controlling circuit is increased so that the shift register formed on the display panel may be driven using the control signal or the clock signal.

BRIEF DESCRIPTION OF THE DRAWINGS

The above and other advantages of the present invention will become more apparent by describing in detail exemplary embodiments thereof with reference to the accompanying drawings, in which.

DESCRIPTION OF THE EMBODIMENTS

It should be understood that the exemplary embodiments of the present invention described below may be varied modified in many different ways without departing from the inventive principles disclosed herein, and the scope of the present invention is therefore not limited to these particular following embodiments. Rather, these embodiments are provided so that this disclosure will be through and complete, and will fully convey the concept of the invention to those skilled in the art by way of example and not of limitation.

Hereinafter, the present invention will be described in detail with reference to the accompanying drawings.

Figure 1:
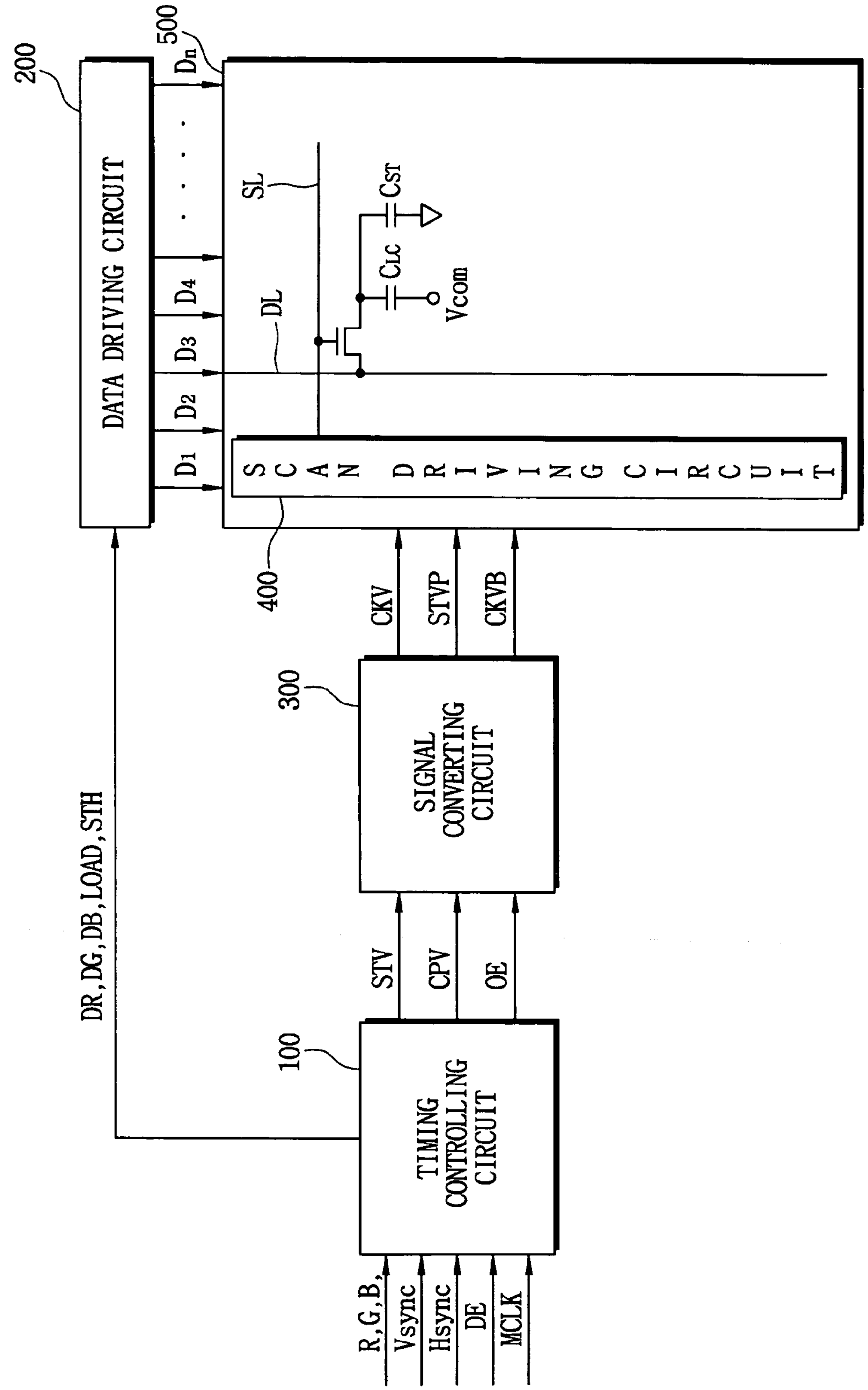
FIG. 1 is a block diagram showing a display apparatus in accordance with an exemplary embodiment of the present invention.

FIG. 1 is a block diagram showing a display apparatus in accordance with an exemplary embodiment of the present invention. The display apparatus includes a liquid crystal display (LCD) apparatus.

Referring to FIG. 1, the LCD apparatus includes a timing controlling circuit 100, a data driving circuit 200, a signal converting circuit 300, a scan driving circuit 400 and an LCD panel 500.

A graphic controller (not shown) that is provided from an exterior to the LCD apparatus outputs primary gray-scale data R, G and B, synchronizing signals Hsync and Vsync, a data enable signal DE and a main clock signal MCLK to the timing controlling circuit 100. The timing controlling circuit 100 outputs gray-scale data DR, DG and DB and data driving signals LOAD and STH to the data driving circuit 200, and outputs scan driving signals to the signal converting circuit 300 based on the primary gray-scale data R, G and B, the synchronizing signals Hsync and Vsync, the data enable signal DE and the main clock signal MCLK. The scan driving signal includes a primary scan start signal STV for selecting a first scan line, a gate selection signal CPV for selecting one of next scan lines and an output enable signal OE for controlling an output of the scan driving circuit 400.

The data driving circuit 200 outputs data driving voltages D1, D2, . . . Dn to the LCD panel 500 based on the gray-scale data R, G and B and the data driving signals LOAD and STH.

The signal converting circuit 300 outputs a first clock signal CKV, a second clock signal CKVB and a converted scan start signal STVP to the scan driving circuit 400 based on the primary scan start signal STV, the gate selection signal CPV and the output enable signal OE. Magnitudes of the primary scan start signal STV, the gate selection signal CPV and the output enable signal OE may be about .+-.3.3V. The signal converting circuit 300 increases the magnitudes of the signals that are inputted to the signal converting circuit 300 so that magnitudes of the first clock signal CKV, the second clock signal CKVB and the converted scan start signal STVP may be about −30V to about 40V.

The signal converting circuit 300 may include one chip having a terminal of the primary scan start signal STV, a terminal of the gate selection signal CPV, a terminal of the output enable signal OE, a terminal of the first clock signal CKV, a terminal of the second clock signal CKVB and a terminal of the converted scan start signal STVP. Alternatively, the signal converting circuit 300 may be directly formed on the LCD panel 500. In addition, the timing controlling circuit 100 and the data driving circuit 200 may also be directly formed on the LCD panel 500.

The LCD panel 500 includes the scan driving circuit 400 having a shift register. The scan driving circuit 400 turns on a switching element electrically connected to a scan line that is electrically connected to the scan driving circuit 400 based on the first clock signal CKV, the second clock signal CKVB and the converted scan start signal STVP. The LCD panel 500 may include a plurality of the scan lines. Each of the scan lines may be electrically connected to a plurality of the switching elements. The converted scan start signal STVP is applied to a first stage of the shift register. Output signals of the stages are applied to the scan lines, in sequence.

The LCD panel 500 further includes two substrates and a liquid crystal layer disposed between the substrates. The LCD panel 500 also includes a scan line SL for transmitting a scan signal, a data line DL for transmitting an image signal, and the switching element disposed in a region defined by the scan and data lines SL and DL. The data line DL crosses the scan line SL. The scan signal may be the output signal of each of the stages. The switching element may include a thin film transistor (TFT). The switching element is electrically connected to the scan and data lines SL and DL. Alternatively, the LCD panel 500 may include a plurality of the scan lines and a plurality of the data lines.

The LCD panel 500 further includes a liquid crystal capacitor Clc and a storage capacitor Cst. The LCD panel 500 may include a plurality of the liquid crystal capacitors Clc and a plurality of the storage capacitors Cst. The liquid crystal capacitor Clc is electrically connected to the TFT so that an artificial light or a natural light may pass through the liquid crystal capacitor Clc based on one of the data driving voltages D1, D2, . . . Dn. The TFT is turned on/off so that one of the data driving voltages D1, D2, . . . Dn may be applied to the liquid crystal capacitor Clc. The storage capacitor Cst is electrically connected to the TFT. When the TFT is turned on, an electric charge formed by one of the data driving voltages D1, D2, . . . Dn is stored in the storage capacitor Cst. When the TFT is turned off, the stored electric charge forms a voltage difference between two electrodes of the liquid crystal capacitor Clc.

Figure 2:
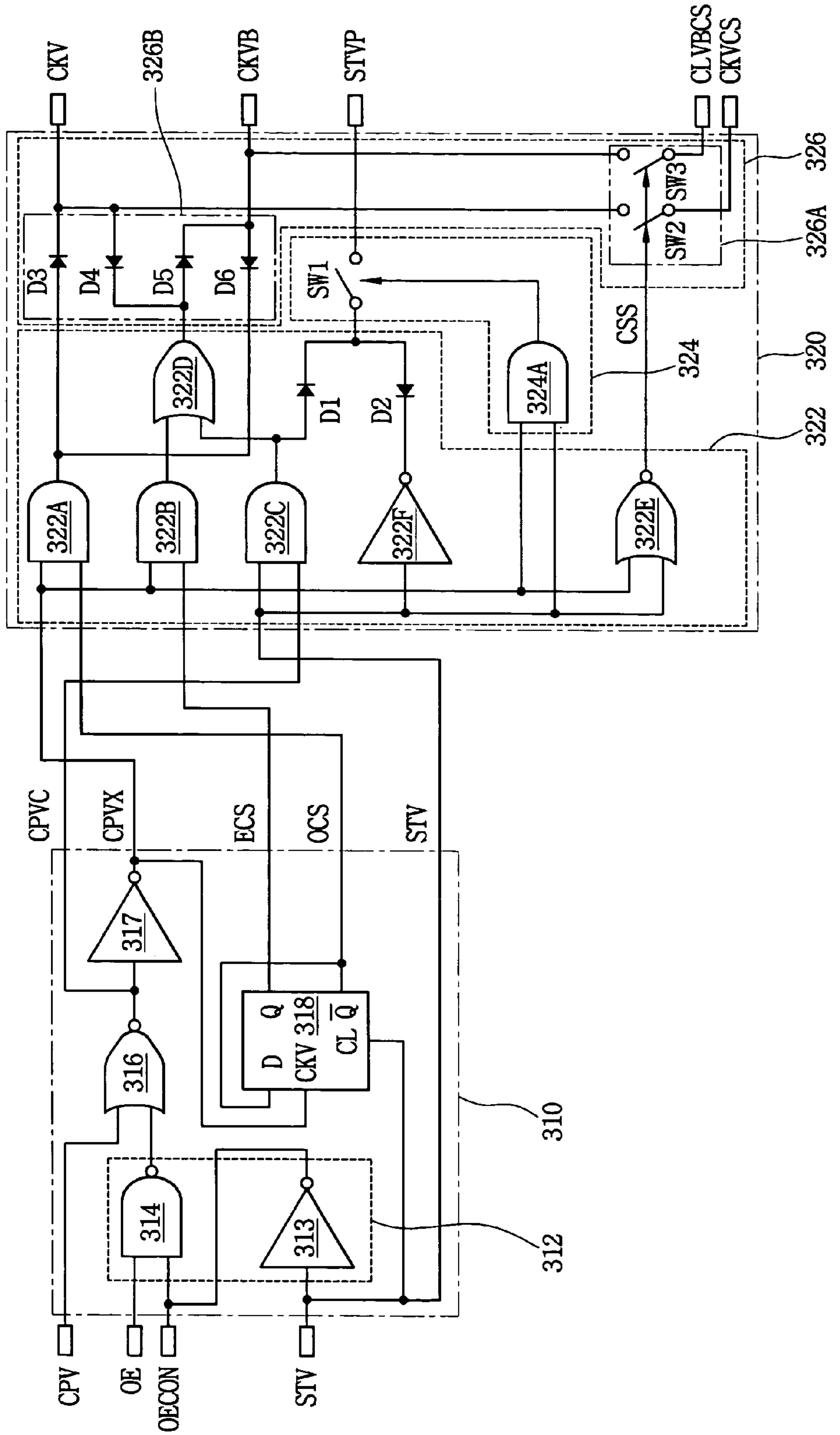
FIG. 2 is a circuit diagram showing a signal converting circuit shown in FIG. 1.

FIG. 2 is a circuit diagram showing a signal converting circuit shown in FIG. 1.

Referring to FIGS. 1 and 2, the signal converting circuit 300 includes a conversion control part 310 and a signal output part 320. The signal converting circuit 300 converts the magnitudes of the signals outputted from the timing controlling circuit 100 so that the signals having the converted magnitudes are applied to the scan driving circuit 400.

The conversion control part 310 includes a blanking delayer 312, a NOR gate 316, a second reverser 317 and a D-flip-flop 318. The conversion control part 310 receives the gate selection signal CPV, the output enable signal OE, an output enable blanking signal OECON and the primary scan start signal STV that are outputted from the timing controlling circuit 100 to output a first line selection signal CPVC, a second line selection signal CPVX, an odd numbered line control signal OCS and an even numbered line control signal ECS to the signal output part 320. Alternatively, the conversion control part 310 may also output a plurality of the odd numbered line control signals and a plurality of the even numbered line control signals.

The blanking delayer 312 includes a first reverser 313 and a NAND gate 314. The first reverser 313 reverses the primary scan start signal STV. The NAND gate 314 receives the output enable signal OE and the output enable blanking signal OECON.

The first NOR gate 316 outputs a first line selection signal CPVC to the signal output part 320 and the second reverser 317 based on the gate selection signal CPV and an output signal of the blanking delayer 312.

The second reverser 317 reverses the first line selection signal CPVC to output a second line selection signal CPVX to the signal output part 320 and the D-flip-flop 318.

The D-flip-flop 318 is initialized by the primary scan start signal STV, and the D-flip-flop 318 calculates the second line selection signal CPVX to output the even numbered line control signal ECS and the odd numbered line control signal OCS to the signal output part 320.

The signal output part 320 includes an operator 322, a start signal selector 324 and a clock generator 326. The signal output part 320 outputs the first clock signal CKV, the second clock signal CKVB and the converted scan start signal STVP to the scan driving circuit 400 based on the first line selection signal CPVC, the second line selection signal CPVX, the odd numbered line control signal OCS and the even numbered line control signal ECS.

The operator 322 includes a first AND gate 322A, a second AND gate 322B, a third AND gate 322*c*, an OR gate 322D, a second NOR gate 322E, a third reverser 322F, a first diode D1 and a second diode D2. The first AND gate 322A performs an AND operation between the first line selection signal CPVC and the second line selection signal VPVX to output an output signal of the first AND gate 322A to the clock generator 326. The second AND gate 322B performs an AND operation between the even numbered line control signal OCS and the second line selection signal CPVX to output an output signal of the second AND gate 322B to the OR gate 322D.

The third AND gate 322C performs an AND operation between the first line selection signal CPVC and the primary scan start signal STV to output an output signal of the third AND gate 322C to the OR gate 322D and the first diode. The OR gate 322D performs an OR operation between the output signal of the second AND gate 322B and the output signal of the third AND gate 322C to output an output signal of the OR gate 322D to the clock generator 326.

The second NOR gate 322E performs a NOR operation between the second line selection signal CPVX and the primary scan start signal STV to output an output signal of the second NOR gate 322E to the clock generator 326. The third reverser 322F reverses the primary scan start signal STV to output an output signal of the third reverser 322F to the second diode D2.

The output signal of the second AND gate 322B is applied to a first anode of the first diode D1, and a first cathode of the first diode D1 is electrically connected to the start signal selector 324. A second anode of the second diode D2 is electrically connected to the first cathode of the first diode D1, and the output signal of the third reverser 322F is applied to a second cathode of the second diode D2.

The start signal selector 324 includes a fourth AND gate 324A and a first switch SW1. The start signal selector 324 controls the converted scan start signal STVP based on the primary scan start signal STV and the second line selection signal CPVX.

The clock generator 326 includes a second switch assembly 326A and a charge sharer 326B. The second switch assembly includes a second switch SW2 and a third switch SW3. The second switch assembly 326A controls the first clock signal CKV and the second clock signal CKVB based on a first clock sharing control signal CKVBCS and a second clock sharing control signal CKVCS, respectively. The first and second clock sharing control signals CKVBCS and CKVCS are provided from an exterior to the signal converting circuit 300.

The charge sharer 326B includes a third diode D3, a fourth diode D4, a fifth diode D5 and a sixth diode D6. The charge sharer 326B increases magnitudes of the output signal of the first AND gate 322A and the output signal of the OR gate 322D to output the first and second clock signals CKV and CKVB based on controls of the second and third switches SW2 and SW3.

The output signal of the first AND gate 322A is applied to a third anode of the third diode D3, a third cathode of the third diode D3 is electrically connected to a terminal through which the first clock signal CKV is outputted to the LCD panel 500. A fourth anode of the fourth diode D4 is electrically connected to the third cathode of the third diode D3, and the output signal of the OR gate 322D is applied to a fourth cathode of the fourth diode D4. The output signal of the OR gate 322D is applied to a fifth anode of the fifth diode D5, and a fifth cathode of the fifth diode D5 is electrically connected to a terminal through which the second clock signal CKVB is outputted to the LCD panel 500. The output signal of the first AND gate 322A is applied to sixth cathode of the sixth diode D6, and a sixth anode of the sixth diode D6 is electrically connected to the fifth cathode of the fifth diode D5.

Alternatively, the first switch SW1 may include a TFT controlled by the output signal of the fourth AND gate 324A. In addition, the second and third switches SW2 and SW3 may also include TFTs controlled by the output signal of the second NOR gate 322E.

Figure 3A:
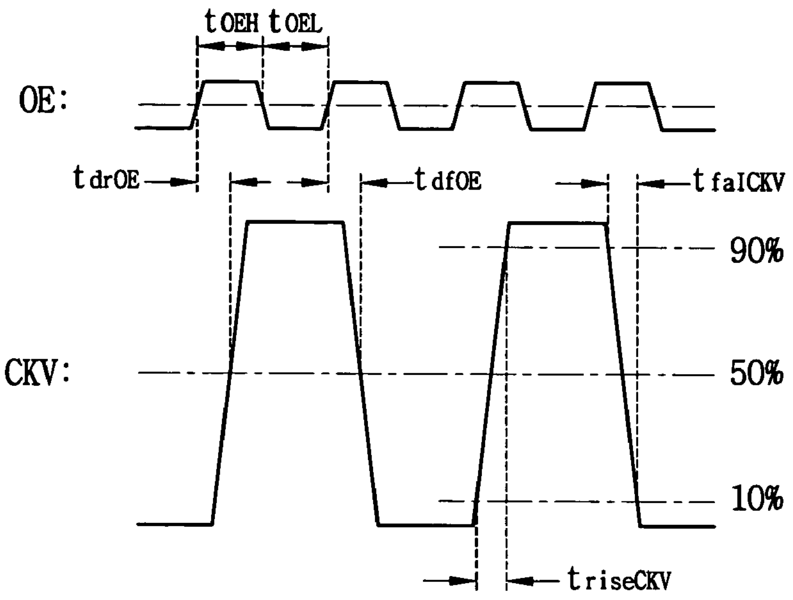
FIGS. 3A and 3B are timing diagrams showing a first clock signal, a magnitude of which is increased based on an output enable signal, and a second scan start signal, a magnitude of which is increased based on a first scan start signal.
Figure 3B:
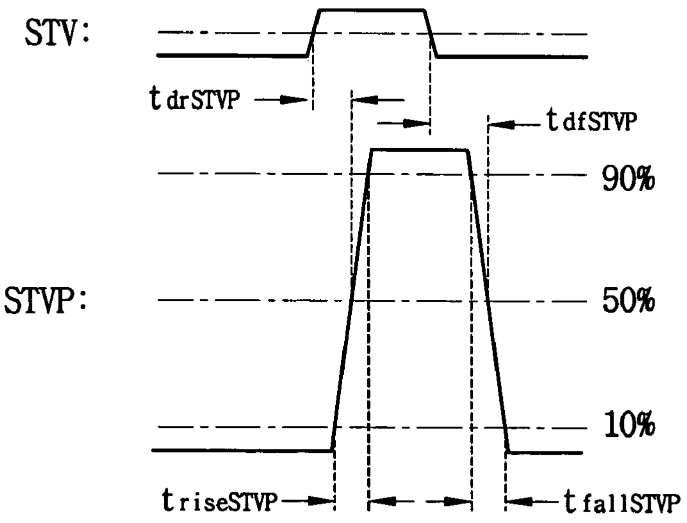

FIGS. 3A and 3B are timing diagrams showing a first clock signal, a magnitude of which is increased based on an output enable signal, and a second scan start signal, a magnitude of which is increased based on a first scan start signal.

Referring to FIG. 3A, when the output enable signal OE that alternates between a high state and a low state is applied to the signal converting circuit 300, the signal converting circuit 300 outputs the first clock signal CKV. A wavelength of the output enable signal OE is about a half of that of the first clock signal. The first clock signal CKV rises after tdrOE has passed a time when the output enable signal OE rises. The first clock signal CKV falls after tdfOE has passed a time when the output enable signal OE rises again. When the output enable signal OE alternates between about OV and about 3.3V, the first clock signal CKV may alternate between about −30V and about 40V.

The second clock signal CKVB has the opposite phase to the first clock signal CKV. The second clock signal CKVB falls after tdrOE has passed a time when the output enable signal OE rises. The second clock signal CKVB rises after tdfOE has passed a time when the output enable signal OE rises again.

Referring to FIG. 3B, when the primary scan start signal STV outputted from the timing controlling circuit 100 rises, the converted scan start signal STVP may rise. When the primary scan start signal STV falls, the second converted scan start signal STVP may fall. In particular, the converted scan start signal STVP rises after tdrSTVP has passed a time when the primary scan start signal STV rises. tdrSTVP corresponds to a time period between a half magnitude of the primary scan start signal STV in case of a rise of the primary scan start signal STV and a half magnitude of the converted scan start signal STVP in case of a rise of the converted scan start signal STVP. The converted scan start signal STVP falls after tdf-STVP has passed a time when the primary scan start signal STV falls. tdfSTVP corresponds to a time period between a half magnitude of the primary scan start signal STV in case of falling down of the primary scan start signal STV and a half magnitude of the converted scan start signal STVP in case of falling down of the converted scan start signal STVP.

Although the timing controlling circuit 100 outputs the primary scan start signal having the low magnitude, the signal converting circuit 300 increases the magnitude of the primary scan start signal STV to output the converted scan start signal STVP to the shift register. Therefore, an amorphous silicon thin film transistor (a-Si TFT) of the LCD panel 500 may be operated using the primary scan start signal STV.

Figure 4A:
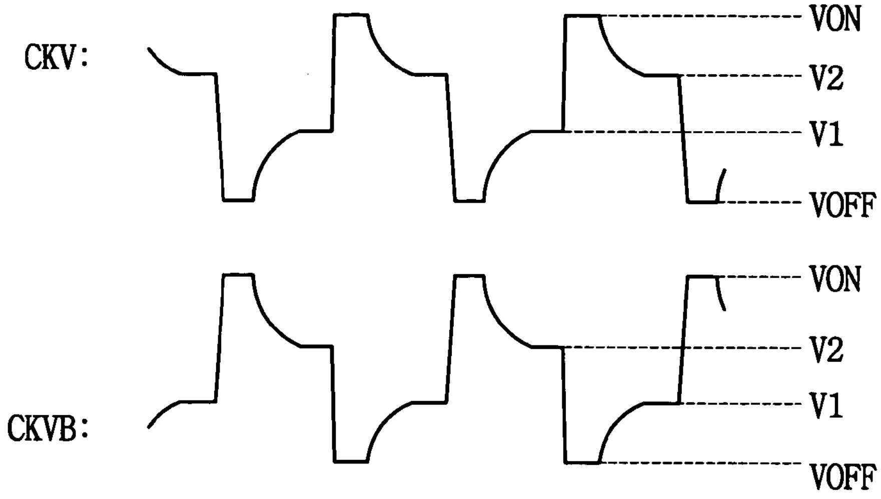
FIGS. 4A to 4C are timing diagrams showing input and output signals of the display apparatus shown in FIG. 1.
Figure 4B:
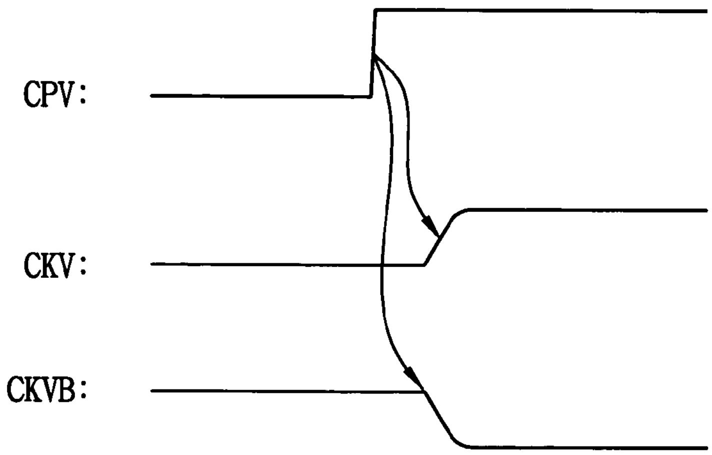
Figure 4C:
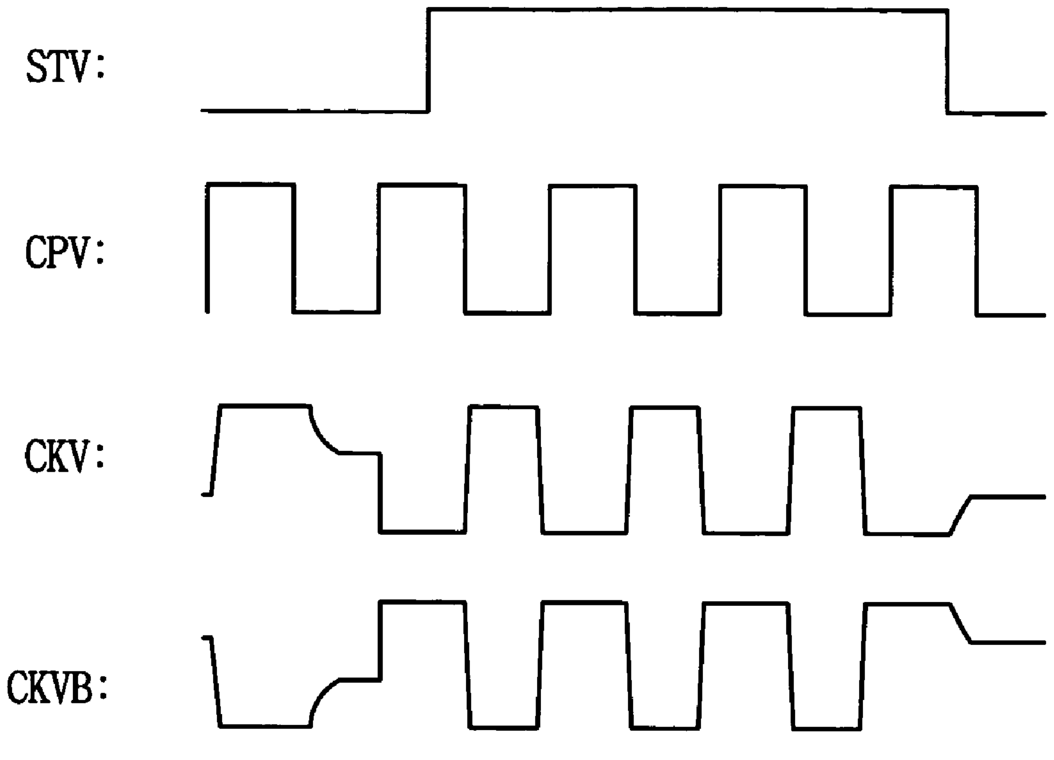

FIGS. 4A to 4C are timing diagrams showing input and output signals of the display apparatus shown in FIG. 1. In particular, FIG. 4A is a timing diagram showing a first clock signal and a second clock signal of initial stage. FIG. 4B is a timing diagram showing a first clock signal and a second clock signal delayed with respect to a gate selection signal. FIG. 4C is a timing diagram showing effect of a primary scan start signal on a gate selection signal, a first clock signal and a second clock signal.

Referring to FIG. 4A, the signal converting circuit 300 outputs a first clock signal CKV having first and intermediate levels V1 and V2 and a second clock signal CKVB having the first and second intermediate levels V1 and V2. That is, the level of the first clock signal CKV having the first and second intermediate levels V1 and V2 is converted from the first voltage VOFF into the second voltage VON through the first intermediate level V1, and then the level of the first clock signal CKV having the first and second intermediate levels V1 and V2 is converted from the second voltage VON into the first voltage VOFF through the second intermediate level V2. The first voltage VOFF is a gate-off voltage, and the second voltage VON is a gate-on voltage.

In addition, the level of the second clock signal CKVB having the first and second intermediate levels V1 and V2 is converted from the second voltage VON into the first voltage VOFF through the second intermediate level V2, and then the level of the second clock signal CKVB having the first and second intermediate levels V1 and V2 is converted from the first voltage VOFF into the second voltage VON through the first intermediate level V1.

Referring to FIG. 4B, when the gate selection signal CPV, magnitude of which is converted from a low magnitude into a high magnitude, is applied to the signal converting circuit 300, the signal converting circuit 300 outputs a first clock signal CKV and a second clock signal CKVB, magnitude of which is converted from a low magnitude into a high magnitude. In particular, the first and second clock signals CKV and CKVB are delayed with respect to the gate selection signal CPV.

Referring to FIG. 4C, the gate selection signal CPV that alternates between the high and low states is applied to the signal selection circuit 300. The magnitude of the primary scan start signal STV is increased. The primary scan start signal STV having the increased magnitude is synchronized with the gate selection signal CPV so that the signal selection circuit 300 outputs the first clock signal CKV alternating between the first and second voltages VOFF and VON and the second clock signal CKVB having the opposite phase to the first clock signal CKV.

Figure 5:
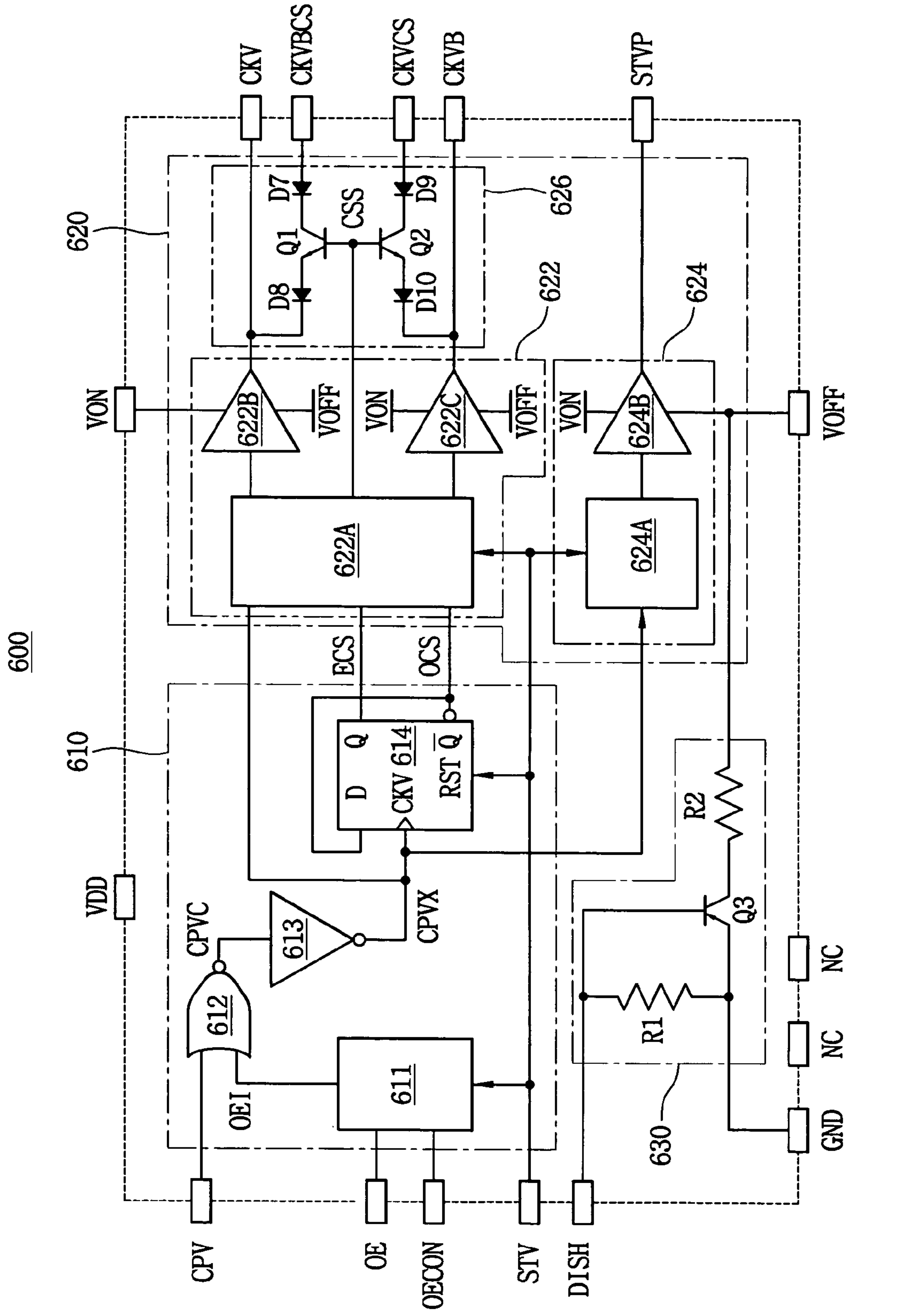
FIG. 5 is a circuit diagram showing a signal converting circuit in accordance with another exemplary embodiment of the present invention.

FIG. 5 is a circuit diagram showing a signal converting circuit in accordance with another exemplary embodiment of the present invention. A display apparatus of the present embodiment is same as in FIG. 1 except the signal converting circuit. Thus, the same reference numerals will be used to refer to the same or like parts as those described in FIG. 1 and any further explanation will be omitted.

Referring to FIGS. 1 and 5, the signal converting circuit 600 includes a conversion control part 610, a signal output part 620 and a discharging part 630. The signal converting circuit 600 increases magnitudes of signals outputted from a timing controlling circuit 100 to output the signals having the increased magnitudes to the scan driving circuit 400.

The conversion control part 610 includes a blanking delay circuit 611, a NOR gate 612, a reverser 613 and a D-flip-flop 614. The timing controlling circuit 400 outputs a gate selection signal CPV, an output enable signal OE, an output enable blanking signal OECON and a primary scan start signal STV to the conversion control part 610. The conversion control part 610 outputs a first line selection signal CPVC, an odd numbered line control signal OCS and an even numbered line control signal ECS based on the gate selection signal CPV, the output enable signal OE, the output enable blanking signal OECON and the primary scan start signal STV.

The blanking delay circuit 611 outputs a blanking delay signal OEI to the NOR gate 612 based on the primary scan start signal STV, the output enable signal OE and the output enable blanking signal OECON.

The NOR gate 612 performs an NOR operation between the blanking delay signal OEI and the gate selection signal CPV to output an output signal of the NOR gate 612 to the reverser 613.

The NOR gate 612 outputs a second line selection signal CPVX to the D-flip-flop 614. The second line selection signal CPVX has an opposite phase to the first line selection signal CPVC. The reverser 613 outputs the second line selection signal CPVX to the D-flip-flop 614.

The D-flip-flop 614 is initialized by the primary scan start signal STV, and the D-flip-flop 614 calculates the second line selection signal CPVX to output the even numbered line control signal ECS and the odd numbered line control signal OCS to a first sub-logic circuit 622A.

The signal output part 620 includes a clock generator 622, a start signal generator 624 and a charge sharer 616. The signal output part 620 outputs a first clock signal CKV, a second clock signal CKVB and a converted scan start signal STVP to the scan driving circuit 400 based on a first clock sharing control signal CKVCS and a second clock sharing control signal CKVBCS. The first and second clock sharing control signals CKVCS and CKVBCS are provided from an exterior to the signal converting circuit 600.

The clock generator 622 includes a first sub-logic part 622A, a first buffer 622B and a second buffer 622C. A first voltage VOFF and a second voltage VON are applied to the first and second buffers 622B and 622C, respectively. The first sub-logic part 622A outputs a first primary clock signal for a first clock signal CKV, a second primary clock signal for a second clock signal CKVB and a charge sharing control signal to a charge sharer 626 based on the second line selection signal CPVX, the odd numbered line control signal OCS and the even numbered line control signal ECS.

The start signal generator 624 includes a second sub-logic part 624A and a third buffer 624B. The second sub-logic part 624A outputs the converted scan start signal STVP to the third buffer 624B based on the primary scan start signal STV and the second line selection signal CPVX.

The charge sharer 626 includes a seventh diode D7, a first transistor Q1 and an eighth diode D8. A first collector of the first transistor Q1 is electrically connected to a seventh cathode of the seventh diode D7. An eighth anode of the eighth diode D8 is electrically connected to a first emitter of the first transistor Q1, and an eighth cathode of the eighth diode D8 is electrically connected to a first output electrode of the first buffer 622B. When the first transistor Q1 is turned on by the charge sharing control signal, the charge sharer 626 outputs the first clock signal CKV having the increased magnitude based on the second clock sharing control signal CKVBCS.

In addition, the charge sharer 626 further includes a ninth diode D9, a second transistor Q2 and a tenth diode D10. A second collector of the second transistor Q2 is electrically connected to a ninth cathode of the ninth diode D9. A tenth anode of the tenth diode D10 is electrically connected to a second emitter of the second transistor Q2, and a tenth cathode of the tenth diode D10 is electrically connected to a second output electrode of the second buffer 622C. When the charge sharer 626 is turned on by the charge sharing control signal, the charge sharer 626 outputs the second clock signal CKVB having the increased magnitude based on the first clock sharing control signal CKVCS.

The discharging part 630 includes a third transistor Q3, a first resistor R1 and a second resistor R2. The first resistor R1 is electrically connected between a third emitter of the third transistor Q3 and a third base of the third transistor Q3. The second resistor R2 is electrically connected to a third collector of the third transistor Q3 and the first voltage VOFF. When a discharge control signal DISH is applied to the discharging part 630, the third transistor Q3 is turned on so that a VOFF terminal receiving the first voltage VOFF is electrically connected to a GND terminal that is grounded, thereby performing a rapid discharge. Therefore, elements of an LCD panel may be rapidly turned off.

According to the present invention, although the shift register receives the control signals or the clock signals having low magnitude, for example, such as about ±3.3V from the timing controlling circuit, the magnitudes of the control signals and the clock signals are increased so that the control signals and the clock signals have magnitudes of about −30V to about 40V. Therefore, operation of the shift register in the LCD panel is stabilized.

In addition, although a size of the LCD panel, length of the scan lines and number of the switching elements electrically connected to each of the scan lines are increased, the scan line is activated using the control signals and the clock signals having the increased magnitudes to prevent an electromagnetic radiation on the scan line, thereby improving an image display quality of the LCD apparatus.

Furthermore, the signal converting circuit may include the discharging circuit so that the terminal receiving the first voltage is electrically connected to the ground potential. Therefore, the elements of the LCD panel may be rapidly turned off.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A signal converting circuit comprising:

a conversion control part configured to generate a first line selection signal, a second line selection signal, an odd numbered line control signal and an even numbered line control signal from a primary scan start signal that selects a first scan line, a gate selection signal that selects a next scan line and an output enable signal that controls an output of a scan line driving part; and a signal output part configured to output a first clock signal, a second clock signal and a converted scan start signal based on the first and second line selection signals, the odd and even numbered line control signals and the primary scan start signal, the first and second clock signals having higher magnitudes than the line selection signals and the line control signals, the converted scan start signal having a higher magnitude than the primary scan start signal to select the first scan line.

2. The signal converting circuit of claim 1, wherein the signal converting circuit is disposed between a timing controlling circuit and a shift register of a display panel, and wherein the primary scan start signal, the gate selection signal and the output enable signal are transmitted from the timing controlling circuit to the signal converting circuit, and the first and second clock signals and the converted scan start signal are transmitted from the signal converting circuit to the shift register.

3. The signal converting circuit of claim 1, wherein the signal output part comprises:

an operator including logic gates configured to perform operations on the first and second line selection signals, the odd and even numbered line control signals and the primary scan start signal, and generating output signals;

a start signal selector configured to control the converted scan start signal based on an AND operation between the second line selection signal and the primary scan start signal; and a clock generator configured to output the first and second clock signals based on the output signals of the operator.

4. The signal converting circuit of claim 3, wherein the operator comprises:

a first AND gate configured to perform an AND operation between the second line selection signal and the odd numbered line control signal to generate an output signal of the first AND gate;

a second AND gate configured to perform an AND operation between the second line selection signal and the even numbered line control signal to generate an output signal of the second AND gate;

a third AND gate configured to perform an AND operation between the primary scan start signal and the first line selection signal to generate an output signal of the third AND gate;

an OR gate configured to perform an OR operation between the output signal of the second AND gate and the output signal of the third AND gate to generate an output signal of the OR gate;

a primary scan start signal reverser configured to reverse the primary scan start signal; a first diode including a first anode that receives the output signal of the second AND gate and a first cathode that is electrically connected to the start signal selector; and a second diode including a second anode that is electrically connected to the first cathode and a second cathode that receives the reversed primary scan start signal.

5. The signal converting circuit of claim 4, wherein the clock generator comprises:

a switch assembly configured to control the first and second clock signals based on the output signal of the second NOR gate, a first clock sharing control signal and a second clock sharing control signal, the first and second clock sharing control signals being provided from an exterior to the signal converting circuit; and a charge sharer configured to output the first and second clock signals based on a control of the switch assembly, the output signal of the first AND gate and the output signal of the OR gate.

6. The signal converting circuit of claim 5, wherein the charge sharer comprises:

a third diode including a third anode that receives the output signal of the first AND gate and a third cathode receiving the first clock signal;

a fourth diode including a fourth anode electrically connected to the third cathode and a fourth cathode receiving the output signal of the OR gate;

a fifth diode including a fifth anode receiving the output signal of the OR gate and a fifth cathode receiving the second clock signal; and a sixth diode including a sixth cathode receiving the output signal of the first AND gate and a sixth anode electrically connected to the fifth cathode.

7. The signal converting circuit of claim 5, wherein the start signal selector comprises a thin film transistor configured to control the converted scan start signal.

8. The signal converting circuit of claim 5, wherein the clock generator comprises a plurality of thin film transistors configured to control the first and second clock signals.

9. The signal converting circuit of claim 1, wherein the conversion control part comprises a D-flip-flop configured to output the odd and even line control signals based on the second line selection signal and the primary scan start signal.

10. The signal converting circuit of claim 9, wherein the conversion control part further comprises:

a blanking delayer configured to output a blanking delay signal based on the primary scan start signal, the output enable signal and an output enable blanking signal;

a first NOR gate configured to perform a NOR operation between the blanking delay signal and the gate selection signal to output the first line selection signal; and a reverser configured to reverse the first line selection signal to output the second line selection signal.

11. A display apparatus comprising:

a timing controlling circuit configured to output a primary image signal, a primary scan start signal, a gate selection signal and an output enable signal;

a data driving circuit configured to output an image signal based on the primary image signal;

a signal converting circuit configured to increase magnitudes of the primary scan start signal, the gate selection signal and the output enable signal to generate a first clock signal, a second clock signal and a converted scan start signal, the first and second clock signals having higher magnitudes than the gate selection signal and the output enable signal, the converted scan start signal having a higher magnitude than the primary scan start signal;

a scan driving circuit configured to output scan signals, in sequence, based on the first and second clock signals and the converted scan start signal; and a display panel including scan lines that transfer the scan signals, a data line that transfers the image signal, a switching element disposed in a region defined by the scan and data lines, and a pixel electrode that is electrically connected to the switching element.

12. The display apparatus of claim 11, wherein the signal converting circuit comprises one chip having a terminal of the primary scan start signal, a terminal of the gate selection signal, a terminal of the output enable signal, a terminal of the first clock signal, a terminal of the second clock signal and a terminal of the converted scan start signal.

13. The display apparatus of claim 11, wherein the signal converting circuit is directly formed on the display panel.

14. The display apparatus of claim 11, wherein the signal converting circuit comprises:

a conversion control part configured to output a first line selection signal, a second line selection signal, an odd numbered line control signal and an even numbered line control signal based on the primary scan start signal, the gate selection signal and the output enable signal; and a signal output part configured to output the first and second clock signals and the converted scan start signal to the scan driving circuit based on the first and second line selection signals, the odd and even numbered line control signals and the primary scan start signal, the first and second clock signals having higher magnitudes than the line selection signals and the line control signals, the converted scan start signal having higher magnitude than the primary scan start signal to select the first scan line.

15. The display apparatus of claim 11, wherein the scan driving circuit is directly formed on the display panel.

16. The display apparatus of claim 15, wherein the scan driving circuit comprises a shift register having a plurality of stages to output the scan signals to the scan lines, in sequence, and the converted scan start signal is applied to a first stage of the stages.

* * * * *